US006538492B2

(12) United States Patent
Sano et al.

(10) Patent No.: US 6,538,492 B2
(45) Date of Patent: Mar. 25, 2003

(54) POWER SUPPLY, ELECTRONIC DEVICE USING THE SAME, AND OUTPUT

(75) Inventors: Naoto Sano, Otsu (JP); Shingo Kunii, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/873,053

(22) Filed: Jun. 1, 2001

(65) Prior Publication Data

US 2001/0050591 A1 Dec. 13, 2001

(30) Foreign Application Priority Data

Jun. 8, 2000 (JP) ...................................... 2000-172155

(51) Int. Cl.[7] .................................................. H02J 3/38
(52) U.S. Cl. ...................................... 327/530; 327/535
(58) Field of Search ................................ 327/530, 502, 327/363, 100, 124, 535, 537, 309–333; 361/3

(56) References Cited

U.S. PATENT DOCUMENTS 4,566,052 A * 1/1986 Kammiller .................. 323/285
5,134,357 A * 7/1992 Iwasaki et al. ............. 323/222
5,724,235 A * 3/1998 Shimamori et al. ...... 363/21.06
5,856,741 A * 1/1999 Hasegawa ................... 323/272
5,859,757 A * 1/1999 Hanafusa et al. ........... 361/100
5,966,003 A * 10/1999 Takimoto et al. ........... 323/224
6,201,674 B1 * 3/2001 Warita et al. ............... 323/277

* cited by examiner

*Primary Examiner*—Kenneth B. Wells
*Assistant Examiner*—Cassandra Cox
(74) *Attorney, Agent, or Firm*—Keating & Bennett, LLP

(57) ABSTRACT

A power supply converts a first direct-current voltage into a second direct-current voltage and outputs the second direct-current voltage. The power supply includes a reference voltage generating circuit for generating a reference voltage, a control circuit for controlling an output voltage in accordance with the reference voltage, and a short-circuit detecting circuit for performing an output short-circuit protection operation, when short circuiting occurs at the output, by detecting the occurrence of short circuiting and by decreasing the reference voltage so that the output voltage is decreased.

18 Claims, 4 Drawing Sheets

POWER SUPPLY, ELECTRONIC DEVICE USING THE SAME, AND OUTPUT

BACKGROUND OF THE INVENTION

1. Field of the Invention

The present invention relates to a power supply, an electronic device using the same, and an output short-circuit protection method for the same.

2. Description of the Related Art

FIG. 7 shows the circuit diagram of a conventional power supply. In FIG. 7, a power supply 1 includes a direct-current power supply $V_{cc}$, transistors Q1 and Q2, an operational amplifier OP1, a Zener diode ZD, resistors R1, R2, R3, and R4, capacitors C1 and C2, and an output terminal $P_{out}$.

The direct-current power supply $V_{cc}$ is connected to the collector of the transistor Q1, which is a regulator element. The emitter of the transistor Q1 is connected via the resistor $R_s$ to the output terminal $P_{out}$. Two input terminals of the operational amplifier OP1 are connected across the resistor $R_s$, and the output of the operational amplifier OP1 is connected to the base of the transistor Q1. The base of the transistor Q1 is connected to the collector of the transistor Q2. The emitter of the transistor Q2 is coupled to ground via the Zener diode ZD. The cathode of the Zener diode ZD is connected via the resistor R1 to the direct-current power supply $V_{cc}$. The resistor R2 is connected between the base and the collector of the transistor Q1. The direct-current power supply $V_{cc}$ is connected in parallel with the capacitor C1. A capacitor is connected between P and ground and C2 and it is also grounded via the resistors R3 and R4 are connected in parallel, as shown, to capacitor C2. The node between the resistors R3 and R4 is connected to the base of the transistor Q2.

In the power supply 1 having such a construction, the emitter of the transistor Q2 is maintained at a reference voltage $V_{ref}$ by the resistor R1 and the Zener diode ZD. The voltage of the output terminal $P_{out}$ is detected using the resistors R3 and R4. The transistor Q2 is controlled using the detected voltage. The transistor Q2 controls the transistor Q1 so that the voltage of the output terminal $P_{out}$ is maintained based on the reference voltage $V_{ref}$. The capacitors C1 and C2 are smoothing capacitors. The resistor R2 is a starting resistor for the transistor Q1. In addition, a load (not shown) is connected between the output terminal $P_{out}$ and ground.

An output short-circuit protection operation at the time when short-circuiting occurs at the output side is described. In this application, short-circuiting means not only complete short-circuiting but also a case in which a large amount of current flows through the load because the resistance of the load is decreased below a predetermined resistance. The output of the transistor Q1 is connected in series with the resistor $R_s$. The voltage drop across the resistor $R_s$ is generated in proportion to the magnitude of the output current and is input into the operational amplifier OP1. When a voltage drop of a predetermined value or above is input into the operational amplifier OP1, the output voltage is decreased. Therefore, a large amount of current flowing through the resistor $R_s$ due to the occurrence of short-circuiting at the output side causes the base voltage of the transistor Q1 to decrease. When the base voltage of the transistor Q1 is decreased, the transistor Q1 is turned off, preventing the output current from flowing. That is, in the power supply 1, the output short-circuit protection operation is realized using the resistor $R_s$ and the operational amplifier OP1.

FIG. 8 shows the circuit diagram of another conventional power supply. Components in FIG. 8 that are equivalent to the corresponding components in FIG. 7 have the same reference numerals and descriptions thereof are omitted.

In FIG. 8, a power supply 2 includes transistors Q3 and Q4, resistors R5, R6, and R7, and capacitor C3 instead of the resistor $R_s$ and the operational amplifier OP1 in the power supply 1 shown in FIG. 7. The direct-current power supply $V_{cc}$ is connected to ground via the resistor R5 and the capacitor C3 in this order. The node between the resistor R5 and the capacitor C3 is connected to the emitter of the transistor Q3. The output terminal $P_{out}$ is connected to ground via the resistors R6 and R7 in this order. The node between the resistors R6 and R7 is connected to the base of the transistor Q3. The collector of the transistor Q3 is connected to the base of the transistor Q4. The collector of the transistor Q4 is connected to the base of the transistor Q1, and the emitter of transistor Q4 is grounded.

In a case in which the load is normal, the operation of the power supply 2 having such a construction is similar to that of the power supply 1. The description of the operation of the power supply 2 in this case is therefore omitted.

When short-circuiting occurs at the output side of the power supply 2, an output short-circuit protection operation is described. Since the resistors R6 and R7 are connected between the output terminal $P_{out}$ and the ground, the output voltage can be found at the node with the output terminal $P_{out}$. When short-circuiting occurs at the output side, voltage drop occurs at the node between the resistors R6 and R7, and the transistor Q3 is turned on. When the transistor Q3 is turned on, the current flows via the resistor R5 and the transistor Q3 into the base of the transistor Q4, and the transistor Q4 is turned on. When the transistor Q4 is turned on, the collector voltage of the transistor Q4 is decreased. Accordingly, since the base voltage of the transistor Q1 connected to the collector of the transistor Q4 is also decreased, the transistor Q1 is turned off. This prevents the output current from flowing. That is, in the power supply 2, the output short-circuit protection operation is realized using the transistors Q3 and Q4, the resistors R5, R6, and R7, and the capacitor C3.

When the power supply 2 is first turned on, since the base voltage of the transistor Q3 is substantially 0V, the output short-circuit protection operation would be immediately activated. Therefore, a delay circuit including the resistor R5 and the capacitor C3 for preventing the transistor Q3 from turning on when the power is first turned on is provided. Due to the operation of this delay circuit, a significant amount of time is required for the emitter voltage of the transistor Q3 to increase. Since the transistor Q3 is not turned on during this time, unnecessary output short-circuit protection operation is not caused at initial turn on of the power supply.

In the power supply 1 shown in FIG. 7, since the path through which the output current flows is connected in series with the resistor $R_s$, even when the power supply is operated normally, electrical power is consumed at the resistor $R_s$. This decreases the efficiency of the power supply 1.

In the power supply 2 shown in FIG. 8, the delay circuit must be provided so that the output short-circuit protection operation is not activated due to the operation of the transistor Q3 when the power is turned on. Provision of the delay circuit increases the circuit size, which prevents the power supply from being miniaturized and from being less expensive. Furthermore, in the power supply 2, when the transistor Q1 is turned off due to the output short-circuit protection operation, the voltage of the output terminal $P_{out}$ is 0V.

Therefore, even though the short-circuit state at the output side is eliminated, the output short-circuit protection operation remains and is not restored to the normal state. Accordingly, once the output short-circuit protection operation is activated, the power must be turned on again in order to cause the power supply to restore the power supply to the normal state.

SUMMARY OF THE INVENTION

Accordingly, objects of the present invention are to solve the foregoing problems. There are provided a power supply which can perform an output short-circuit protection operation using a simple circuit, an electronic device using the same, and an output short-circuit protection method for the same.

To this end, according to a first aspect of the present invention, there is provided a power supply for converting a first direct-current voltage into a second direct-current voltage and outputting the second direct-current voltage. This power supply includes a reference voltage generating circuit for generating a reference voltage, a control circuit for controlling an output voltage in accordance with the reference voltage, and a short-circuit detecting circuit for performing an output short-circuit protection operation by, when short circuiting occurs at the output side, detecting the occurrence of short circuiting and by decreasing the reference voltage so that the output voltage is decreased.

The power supply may further include a regulator element controlled by the control circuit.

The power supply may further include a switching element which is switched on and off by the control circuit.

In the power supply, the second direct-current voltage may be lower than the first direct-current voltage.

In the power supply, the short-circuit detecting circuit may be a diode connected between the output side and the reference voltage generating circuit.

According to a second aspect of the present invention, an output short-circuit protection method for a power supply converts a first direct-current voltage into a second direct-current voltage and outputs the second direct-current voltage. The output short-circuit protection method comprises the steps of generating a reference voltage, stabilizing the output voltage in accordance with the reference voltage, and performing an output short-circuit protection operation by decreasing the reference voltage when short circuiting occurs at the output side so that the output voltage is decreased.

By constructing the power supply in the above-described manner, in the power supply and the output short-circuit protection method of the present invention, the output short circuit protection method can be performed using a simple circuit.

According to the third aspect of the present invention, an electronic device includes a power supply according to the first aspect of the present invention.

The electronic device according to the present invention can be miniaturized and inexpensive while improvement in the operation thereof is achieved.

BRIEF DESCRIPTION OF THE DRAWING(S)

DETAILED DESCRIPTION OF EMBODIMENTS OF THE INVENTION

Figure 1:
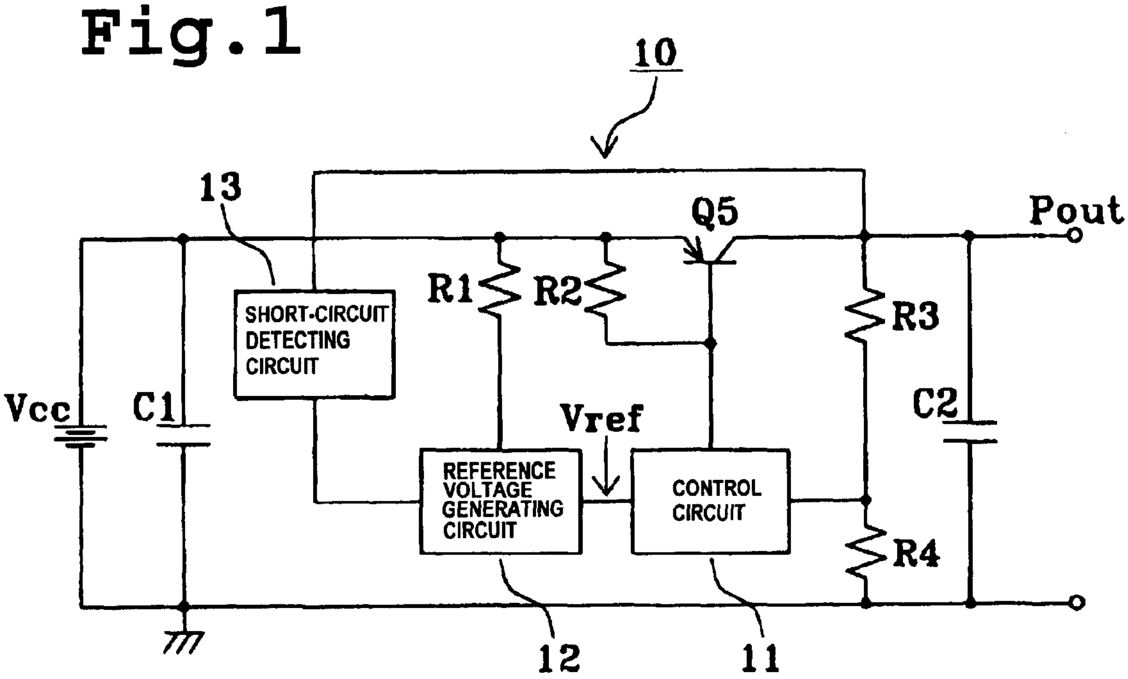
FIG. 1 is a circuit diagram of a power circuit according to a first embodiment of the present invention.
Figure 7:
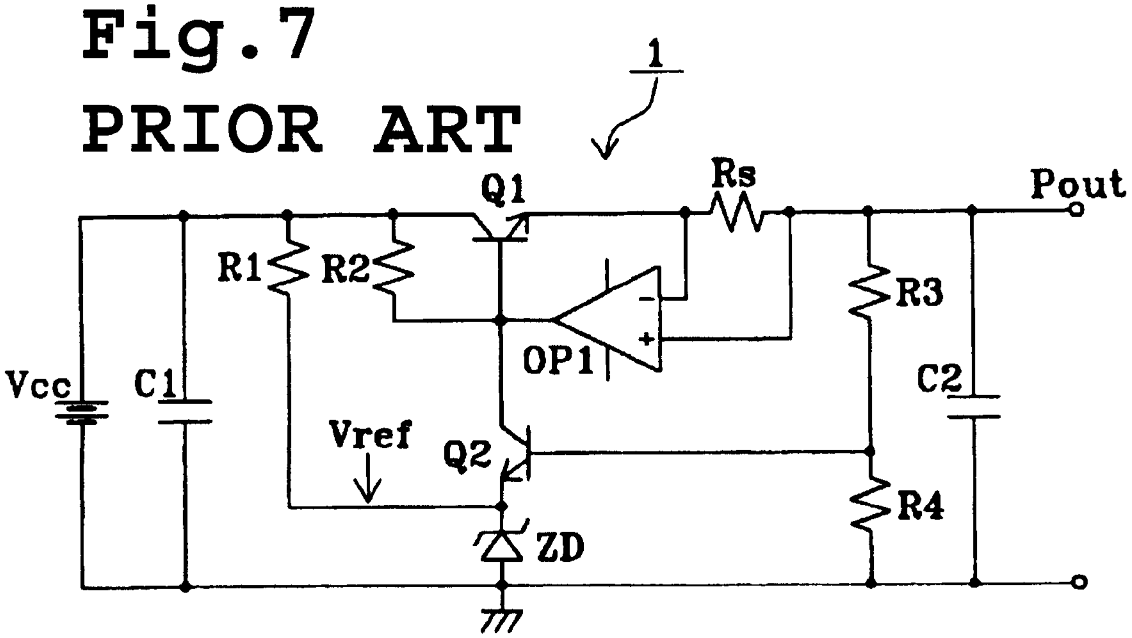
Fig. 7 PRIOR ART
FIG. 7 is a circuit diagram of a conventional power circuit.
Figure 8:
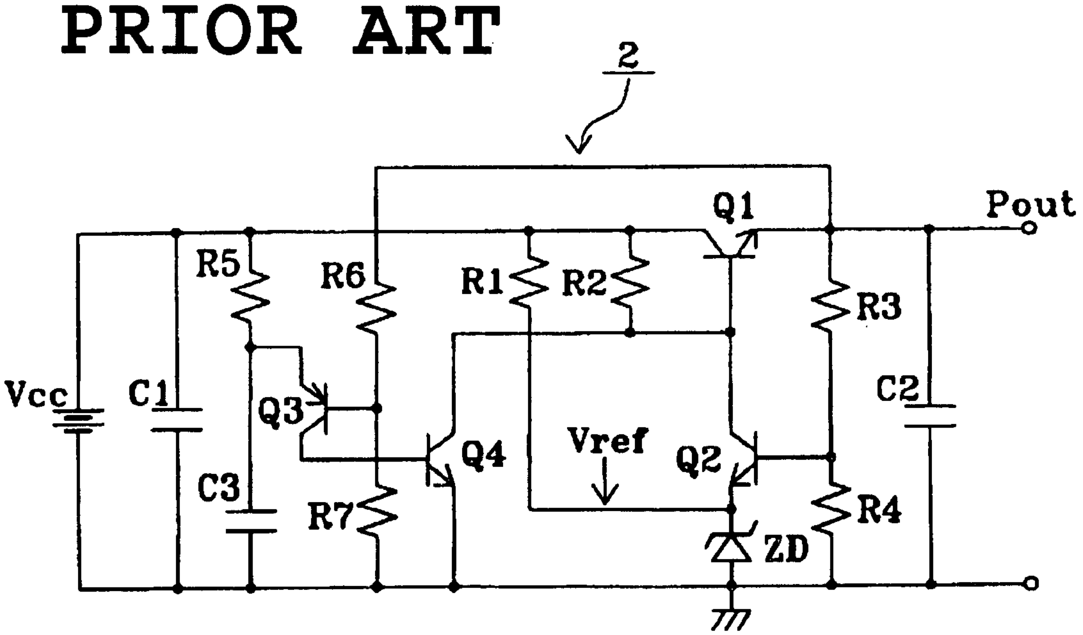
Fig. 8 PRIOR ART
FIG. 8 is a circuit diagram of another conventional power circuit.

FIG. 1 shows a schematic circuit diagram of a power supply according to a first embodiment of the present invention. Components in FIG. 1 that are equivalent to the corresponding components in FIG. 7 have the same reference numerals and descriptions thereof are omitted.

In FIG. 1, a power supply 10 includes a transistor Q5, a control circuit 11, a reference voltage generating circuit 12, and a short-circuit detecting circuit 13 instead of the transistor Q1, the resistor $R_s$, the operational amplifier OP1, the transistor Q2, and the Zener diode ZD. The direct-current power supply $V_{cc}$ is connected to the emitter of the transistor Q5, which is a regulator element. The collector of the transistor Q5 is connected to the output terminal $P_{out}$. The reference voltage generating circuit 12 is connected via the resistor R1 to the direct-current power supply $V_{cc}$. The output of the reference voltage generating circuit 12 is connected to the control circuit 11. The node between the resistors R3 and R4 is also connected to the control circuit 11. The output of the control circuit 11 is connected to the base of the transistor Q5. The output terminal $P_{out}$ is connected via the short-circuit detecting circuit 13 to the reference voltage generating circuit 12.

In the power supply device 10 having such a construction, the control circuit 11 obtains the reference voltage $V_{ref}$ output from the reference voltage generating circuit 12 as a reference and stabilizes the output voltage by controlling the transistor Q5 in accordance with the voltage of the node between the resistors R3 and R4.

An output short-circuit protection operation at the time when short-circuiting occurs at the output side of the power supply 10 is described. When short-circuiting occurs at the output side, the short-circuit detecting circuit 13 detects it and drives the reference voltage generating circuit 12 so that the reference voltage generating circuit 12 decreases the reference voltage $V_{ref}$. Since the control circuit 11 controls the transistor Q5 in accordance with the reference voltage $V_{ref}$, when the reference voltage $V_{ref}$ is decreased, the output voltage is controlled accordingly. The output voltage is given by the following.

$$V_{out}=V_{ref}(R3+R4)/R4$$

According to this equation, when, for example, $V_{ref}$=0V, $V_{out}$=0 V is obtained. Thus, the output short-circuit protection operation is realized.

In the power supply 10, the output short-circuit protection operation can be performed by decreasing the reference voltage at the time when short-circuiting occurs at the output side. In addition, since there is no resistor in the path through which the current flows, wasteful power consumption can be prevented.

Figure 2:
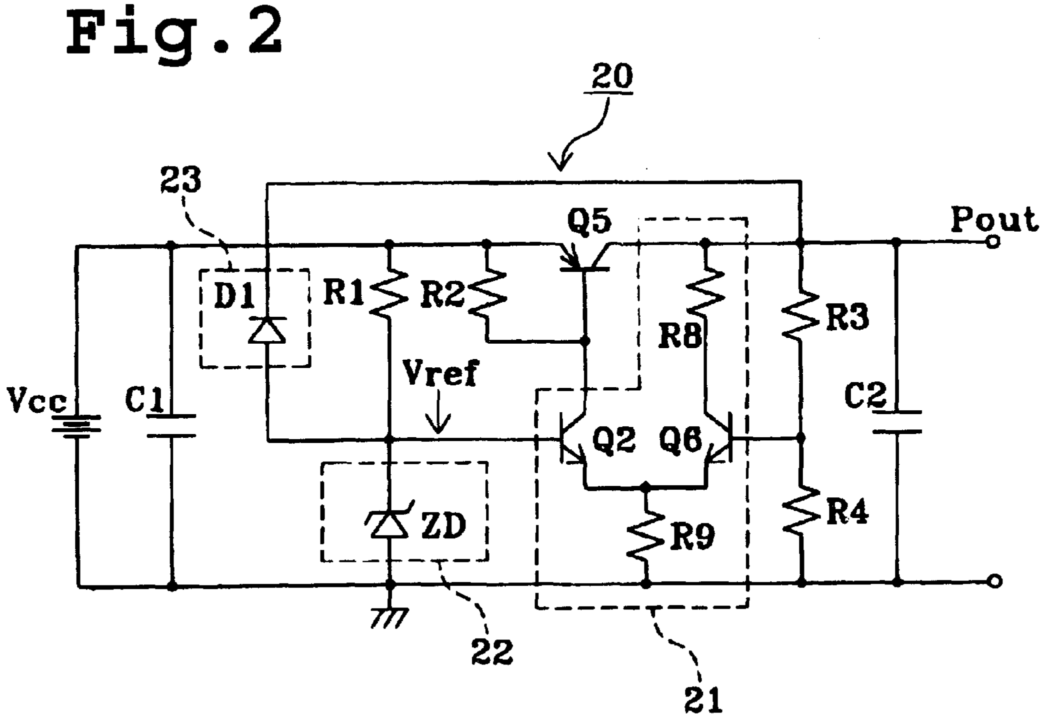
FIG. 2 is a circuit diagram of a power circuit according to a second embodiment of the present invention.

FIG. 2 shows the circuit diagram of a power supply 20 according to a second embodiment. The power supply 20 in FIG. 2 is obtained by embodying the power supply 10 in FIG. 1. Components in FIG. 2 that are equivalent to the corresponding components in FIGS. 1 and 7 have the same reference numerals and descriptions thereof are omitted.

In FIG. 2, the power supply 20 includes a control circuit 21 having resistors R8 and R9, and transistors Q2 and Q6 instead of the control circuit 11 of the power supply 10 in FIG. 1. In addition, the power supply 20 includes a reference voltage generating circuit 22 having a Zener diode ZD instead of the reference voltage generating circuit 12, and a short-circuit detecting circuit 23 having a diode D1 instead of the short-circuit detecting circuit 13. One end of the resistor R8 is connected to the output terminal $P_{out}$ and the other end thereof is connected to the collector of the transistor Q6. The base of the transistor Q6 is connected to the node between the resistors R3 and R4. The emitter of the transistor Q6 is connected to the emitter of the transistor Q2 and is grounded via the resistor R9. The direct-current power supply $V_{cc}$ is connected via the resistor R1 to the cathode of the Zener diode ZD and the anode of the Zener diode ZD is grounded. The node between the resistor R1 and the Zener diode ZD is connected to the anode of the diode D1 and the cathode of the diode D1 is connected to the output terminal $P_{out}$.

In the power supply 20 having such a construction, the control circuit 21 stabilizes the output voltage by controlling the transistor Q5 based on the difference between the voltage of the node between the resistors R3 and R4 and the reference voltage $V_{ref}$ input from the reference voltage generating circuit 22.

An output short-circuit protection operation at the time when short-circuiting occurs at the output side of the power supply 20 is described. When the power supply 20 is operated in a normal state, since the output voltage is greater than the reference voltage $V_{ref}$ output from the reference voltage generating circuit 22, a reverse bias is applied to the diode D1, leading to reverse biasing of the diode D1. When short-circuiting occurs at the output side, since the output voltage is decreased, the cathode voltage of the diode D1 is decreased, leading to an forward biasing of the diode D1. When the diode D1 is in forward biased, the anode voltage of the diode D1 is also decreased. Therefore, the reference voltage $V_{ref}$, which is the cathode voltage of the Zener diode ZD, is also decreased. When the reference voltage $V_{ref}$ is decreased, the transistor Q2 is turned off. This turns off the transistor Q5, and the output short-circuit protection operation is realized.

An operation at the time when the short-circuit state at the output side is eliminated is described. When the short-circuit state at the output side is eliminated, the current flowing through the diode D1 is grounded via the resistors R3 and R4. In this case, the cathode voltage of the diode D1 is increased due to the voltage drops across the resistors R3 and R4. This once again applies a reverse bias to the diode D1, leading to an electrical discontinuity of the diode D1. Thereafter, the reference voltage generating circuit 22 resumes the normal operation and the reference voltage $V_{ref}$ is restored to a predetermined voltage. Accordingly, the control circuit 21 operates such that the output voltage is maintained at a predetermined voltage in accordance with the restored reference voltage $V_{ref}$.

Thus, in the power supply 20, the output short-circuit protection operation can be realized using a very simple circuit. When the short-circuit state at the output side is eliminated, the power supply 20 can be automatically restored to the normal state. Furthermore, since there is no resistance in the path through which the current flows, wasteful power consumption can be prevented. In addition, since the delay circuit for disabling activation of the short-circuit protection circuit at the time of power-on is not required, miniaturized and an inexpensive power supply can be realized.

Figure 3:
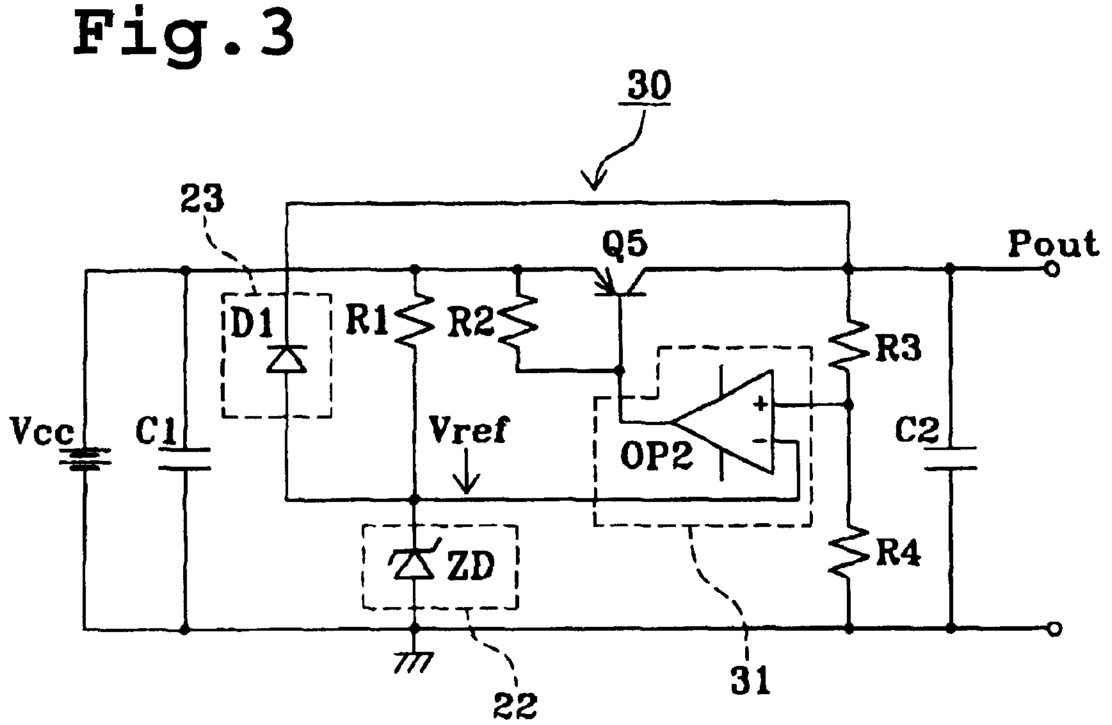
FIG. 3 is a circuit diagram of a power circuit according to a third embodiment of the present invention.

FIG. 3 is the circuit diagram of a power supply according to a third embodiment of the present invention. Components in FIG. 3 that are equivalent to the corresponding components in FIG. 2 have the same reference numerals and descriptions thereof are omitted.

In FIG. 3, the power supply 30 includes a control circuit 31 having an operational amplifier OP2 instead of the control circuit 21 of the power supply 20 in FIG. 2. The node between the resistors R3 and R4 is connected to the noninverting input terminal of the operational amplifier OP2. The node between the resistor R1 and the Zener diode ZD, i.e. the output of the reference voltage generating circuit 22, is connected to the inverting input terminal of the operational amplifier OP2. The output of the operational amplifier OP2 is connected to the base of the transistor Q5.

In the power supply 30 having such a construction, the operational amplifier OP2 constituting the control circuit 31 stabilizes the output voltage by controlling the transistor Q5 based on comparison between the reference voltage $V_{ref}$ input from the reference voltage generating circuit 22 and the voltage of the node between the resistors R3 and R4.

An output short-circuit protection operation at the time when short-circuiting occurs at the output side of the power supply 30 is described. While the power supply 30 is in the normal state, since the output voltage is greater than the reference voltage $V_{ref}$ output from the reference voltage generating circuit 22, a reverse bias is applied to the diode D1, leading to an electrical discontinuity of the diode D1. When short-circuiting occurs at the output side, the output voltage is decreased. This decreases the cathode voltage of the diode D1, leading to forward biasing of the diode D1. When the diode D1 is forward biased, the anode voltage of the diode D1 is decreased. As a result of this, the reference voltage $V_{ref}$, which is the cathode voltage of the Zener diode ZD, is also decreased. Since the operational amplifier OP2 operates such that the voltage applied to the noninverting input terminal is equal to the reference voltage $V_{ref}$, the transistor Q5 is controlled so that the voltage applied to the noninverting input terminal is decreased by decreasing the output voltage when the reference voltage $V_{ref}$ is decreased. Decreasing the output voltage means that the resistance between the emitter and the collector of the transistor Q5 is increased (i.e., the path between the emitter and the collector is isolated). Accordingly, since the current hardly flows from the direct-current power supply $V_{cc}$ to the output terminal $P_{out}$, the output short-circuit protection operation of the power supply 30 is realized.

An operation in a case in which the short-circuit state is eliminated at the output side is described. When the short-circuit state is eliminated, the current flowing through the diode D1 is grounded via the resistors R3 and R4. In this case, when the cathode voltage of the diode D1 is increased due to the voltage drops across the resistors R3 and R4, a reverse bias is once again applied to the diode D1, leading to an electrical discontinuity of the diode D1. Since this reactivates the reference voltage generating circuit 22, the reference voltage $V_{ref}$ is restored to a predetermined voltage. Accordingly, the operational amplifier OP2 constituting the control circuit 31 operates such that the output voltage is maintained at a predetermined voltage in accordance with the restored reference voltage $V_{ref}$.

Thus, in the power supply 30, the output short-circuit protection operation is realized with a very simple circuit. When the short-circuit state at the output side is eliminated, the power supply 30 is automatically restored to the normal state. Since there is no resistance in the path through which the output current flows, wasteful power consumption can be prevented. In addition, since there is no delay circuit for disabling activation of the short-circuit protection circuit at the time of power-on is required, miniaturized and inexpensive power supply 30 can be realized.

The Zener diodes are used as the reference voltage generating circuits 12 and 22 in the power supplies 20 and 30 shown in FIGS. 2 and 3, respectively. Even though other devices are used as the reference voltage generating circuits 12 and 22, the same effects as in the case in which the Zener diode is used are achieved.

Figure 4:
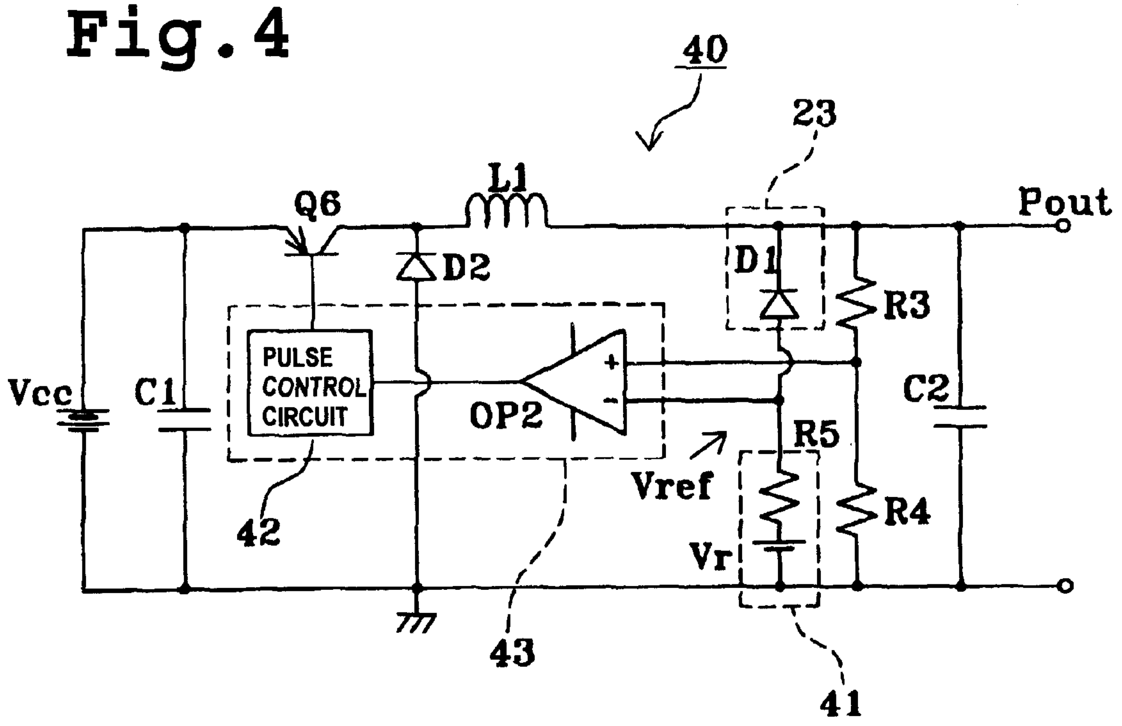
FIG. 4 is a circuit diagram of a power circuit according to a fourth embodiment of the present invention.

FIG. 4 is a circuit diagram of a power supply according to a fourth embodiment of the present invention. Components in FIG. 4 that are equivalent to the corresponding components in FIG. 3 have the same reference numerals and descriptions thereof are omitted.

In FIG. 4, a power supply 40 includes a resistor R5 and a reference power supply $V_r$ instead of the resistor R1 and the Zener diode ZD of the power supply 30 in FIG. 3. The power supply 40 includes a transistor Q6, which is a switching element, a pulse control circuit 42, which performs on-off control of the transistor Q6, an inductor element L1, and a diode D2 instead of the transistor Q5, which is the regulator element, and the resistor R2. The inverting input terminal of the operational amplifier OP2 is connected to ground via the resistor R5 and the reference power supply $V_r$ constituting the reference voltage generating circuit 41 in this order. The voltage of the inverting input terminal is set to the reference voltage $V_{ref}$. The emitter of the transistor Q6 is connected to the direct-current power supply $V_{cc}$ and the collector thereof is connected via the inductor element L1 to the output terminal $P_{out}$. The output of the operational amplifier OP2 is connected to the pulse control circuit 42 and the output of the pulse control circuit 42 is connected to the base of the transistor Q6. The pulse control circuit 41 and the operational amplifier OP2 constitute a control circuit 43.

The power supply 40 having such a construction is a chopper switching power supply and outputs a predetermined voltage from the output terminal $P_{out}$ by controlling an ON time during which the transistor Q6 is turned on and an OFF time during which the transistor Q6 is turned off.

In the power supply 40, an output short-circuit protection operation at the time when short-circuiting occurs at the output side is described. While the power supply 40 operates in the normal state, since the output voltage is higher than the reference voltage $V_{ref}$ output from the reference voltage generating circuit 41, a reverse bias is applied to the diode D1, leading to reverse bias of the diode D1. When short-circuiting occurs at the output side, since the output voltage is decreased, the cathode voltage of the diode D1 is decreased, leading to forward bias of the diode D1. When the diode D1 is forward biased, the anode voltage of the diode D1 is also decreased. Accordingly, the reference voltage $V_{ref}$ is also decreased. Since the operational amplifier OP2 operates such that the voltage input to the noninverting input terminal is equal to the reference voltage $V_{ref}$, the pulse control circuit 42 is driven so that the voltage input to the noninverting input terminal is decreased by decreasing the output voltage at the time when the reference voltage $V_{ref}$ is decreased. Decreasing the output voltage means that the ON time of the transistor Q6 is decreased and the OFF time of the transistor Q6 is increased (ultimately, the transistor Q6 is constantly turned off). Accordingly, the current hardly flows from the direct-current power supply $V_{cc}$ to the output terminal $P_{out}$. Thus, the output short-circuit protection operation of the power supply 40 is realized.

An operation in which the short-circuit state at the output side is eliminated is described. When the short circuit state at the output side is eliminated, the current flowing through the diodes D1 is grounded via the resistors R3 and R4. In this case, the cathode voltage of the diode D1 is increased due to the voltage drops across the resistors R3 and R4 and a reverse bias is once again applied to the diode D1, leading to an electrical discontinuity of the diode D1. This allows the reference voltage generating circuit 41 to resume and the reference voltage $V_{ref}$ is restored to the predetermined voltage. As a result of this, the operational amplifier OP2 and the pulse control circuit 42 constituting the control circuit 43 serve so as to maintain the output voltage at the predetermined output value in accordance with the restored reference voltage $V_{ref}$.

Thus, in the power supply 40 according to the present invention, the output short-circuit protection operation can be realized with a very simple circuit. When the short-circuit state at the output side is eliminated, the power supply 40 can be automatically restored to the normal state. Since there is no resistance through which the output current flows, wasteful power consumption can be prevented. In addition, there is no need to provide a delay circuit for disabling activation of the short-circuit protection circuit at the time when the power is turned on. A miniaturized and inexpensive power supply can be realized.

Figure 5:
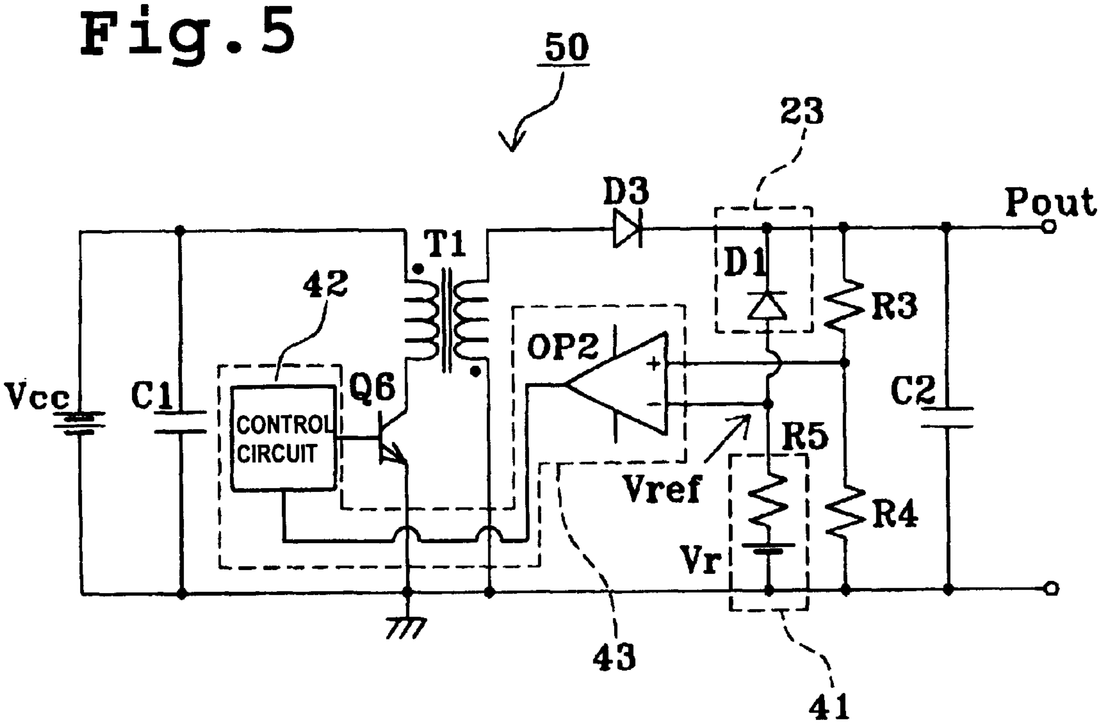
FIG. 5 is a circuit diagram of a power circuit according to a fifth embodiment of the present invention.

FIG. 5 is a circuit diagram of a power supply according to a fifth embodiment of the present invention. Components in FIG. 5 that are equivalent to the corresponding components in FIG. 4 have the same reference numerals and descriptions thereof are omitted.

In FIG. 5, a power supply 50 includes a transistor Q7, which is a switching element, a transformer T1, and a diode D3 instead of the transistor Q6, the inductance element L1, and the diode D2 of the power supply 40 in FIG. 4. One end of the primary winding of the transformer T1 is connected to the direct-current power supply $V_{cc}$ and the other end thereof is connected to the collector of the transistor Q7. The emitter of the transistor Q7 is grounded. One end of the secondary winding of the transformer T1 is connected via the diode D3 to the output terminal $P_{out}$ and the other end thereof is grounded. The output of the pulse control circuit 42 constituting the control circuit 43 is connected to the base of the transistor Q7.

The power supply 50 having such a construction is a flyback switching power supply. In the same manner as in the power supply 40 shown in FIG. 4, a predetermined voltage is output from the output terminal $P_{out}$ by controlling the ON time during which the transistor Q7 is turned on and the OFF time during which the transistor Q7 is turned off.

In the power supply 50, the output short-circuit protection operation is operated in the same manner as in the power supply 40 and the same effect as in the power supply 40 is obtained.

In the power supplies 40 and 50 shown in FIGS. 4 and 5, respectively, batteries are shown as the reference power source for the reference voltage generating circuit 42. These batteries are only examples. The Zener diode, such as one used in the power supply 20 or 30 shown in FIG. 2 or 3, respectively, may be used as the reference power source.

The foregoing embodiments are described using the cases in which step-down power supplies for converting the direct-current voltage into the lower direct-current voltage are employed. As long as the output short-circuit operation is activated by decreasing the reference voltage, the power supply may not be only a step-down power supply but also a step-up transformer.

Although circuits employing diodes are used as the short-circuit detecting circuit in the power supplies 20, 30, 40, and 50, other circuit constructions may be used performing the same function.

Figure 6:
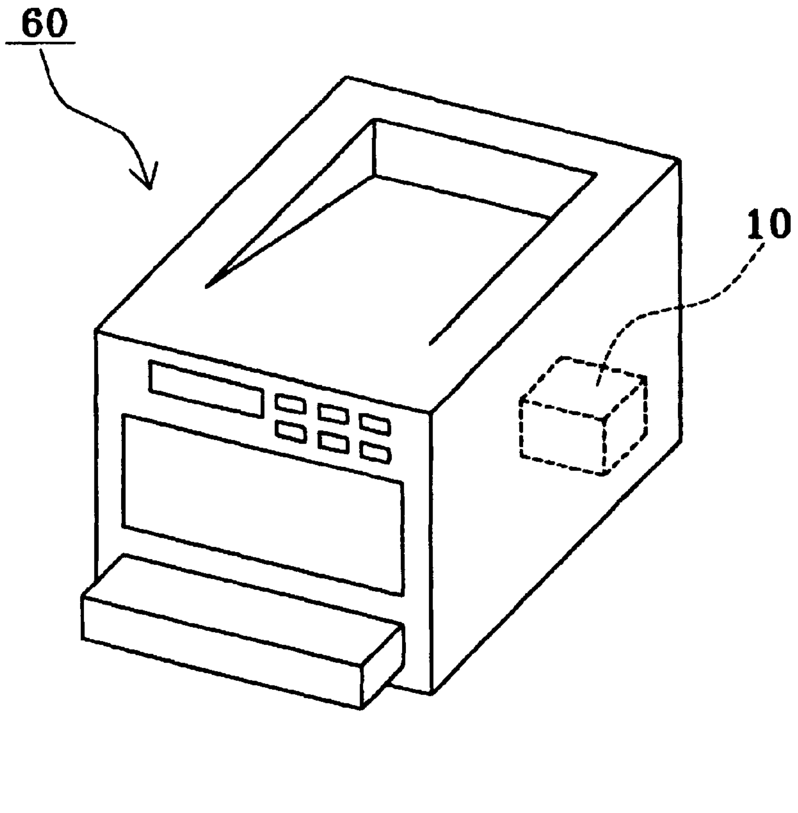
FIG. 6 is a perspective view showing an electronic device according to the present invention.

FIG. 6 shows a perspective view of an electronic device according to the present invention. In FIG. 6, a printer 60, which is one type of electronic device, uses the power supply 10 of the present invention as a part of a power supply circuit. To be more specific, the printer 60 includes a multi-output switching power circuit for obtaining a plurality of required different voltages. The power supply of the present invention, for example, power supply 10, serves as the regulator circuit for outputs excluding stabilized outputs by applying a negative feedback.

Thus, the use of the power supply of the present invention can stabilize the outputs except the outputs undergoing the negative feedback among the multi-outputs of the switching power supply circuit. The stable operation of the printer 60 can be realized by stabilizing the voltage of the power supply, which improves the operation of the printer 60. Since the power supply 10 can be miniaturized and inexpensive, the printer 60 can be miniaturized and inexpensive as well.

Although the power supply 10 shown in FIG. 1 is used in the printer 60 shown in FIG. 6, the power supply 20, 30, 40, or 50 may be used. The same effect can be obtained.

The electronic device according to the present invention is not restricted to a printer and the power supply described can be applied to any electronic device requiring a direct-current source whose voltage is stable, such as a notebook computer or a portable information device.

Although the present invention has been described in relation to particular embodiments thereof, many other variations and modifications and other uses will become apparent to those skilled in the art. Therefore, that present invention should be limited not by the specific disclosure herein, but only by the appended claims.

What is claimed is:

1. A power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit, coupled directly between said output and the reference voltage generating circuit for performing an output short-circuit protection operation whereby, when short circuiting occurs at the output, said short-circuit detecting circuit detects the occurrence of a short circuit and decreases said reference voltage so that the output voltage is decreased.

2. The power supply of claim 1, further comprising a regulator element controlled by said control circuit.

3. The power supply of claim 1, further comprising a switching element which is switched on and off by said control circuit.

4. The power supply of claim 1, wherein said second direct-current voltage is lower than said first direct-current voltage.

5. The power supply of claim 2, wherein said second direct-current voltage is lower than said first direct-current voltage.

6. The power supply of claim 3, wherein said second direct-current voltage is lower than said first direct-current voltage.

7. A power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit for performing an output short-circuit protection operation whereby, when short circuiting occurs at the output, said short-circuit detecting circuit detects the occurrence of a short circuit and decreases said reference voltage so that the output voltage is decreased;

wherein said short-circuit detecting circuit comprises a diode connected between the output and said reference voltage generating circuit.

8. The power supply of claim 2, wherein said short-circuit detecting circuit comprises a diode connected between the output and said reference voltage generating circuit.

9. The power supply of claim 3, wherein said short-circuit detecting circuit comprises a diode connected between the output and said reference voltage generating circuit.

10. The power supply of claim 4, wherein said short-circuit detecting circuit comprises a diode connected between the output and said reference voltage generating circuit.

11. A power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit for performing an output short-circuit protection operation whereby, when short circuiting occurs at the output, said short-circuit detecting circuit detects the occurrence of a short circuit and decreases said reference voltage so that the output voltage is decreased;

wherein the reference voltage generating circuit includes a zener diode.

12. A power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit for performing an output short-circuit protection operation whereby, when short circuiting occurs at the output, said short-circuit detecting circuit detects the occurrence of a short circuit and decreases said reference voltage so that the output voltage is decreased;

wherein the control circuit comprises a comparator having one input connected to the reference voltage generating circuit and another input coupled to sense the output voltage.

13. A power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit for performing an output short-circuit protection operation whereby, when short circuiting occurs at the output, said short-circuit detecting circuit detects the occurrence of a short circuit and decreases said reference voltage so that the output voltage is decreased;

wherein the control circuit comprises a control transistor coupled between the reference voltage generating circuit and the output voltage.

14. An electronic device, the electronic device including a power supply for converting a first direct-current voltage into a second direct-current voltage and outputting said second direct-current voltage at an output, said power supply comprising:

a reference voltage generating circuit for generating a reference voltage;

a control circuit for controlling an output voltage at the output in accordance with said reference voltage; and a short-circuit detecting circuit, coupled directly between said output and the reference voltage generating circuit for performing an output short-circuit protection operation whereby, when short circuiting occurs at the output, said short-circuit detecting circuit detects the occurrence of a short circuit and decreases said reference voltage so that the output voltage is decreased.

15. An output short-circuit protection method for a power supply, the power supply converting a first direct-current voltage into a second direct-current voltage and providing as an output voltage said second direct-current voltage at an output, said output short-circuit protection method comprising the steps of:

generating a reference voltage;

stabilizing the output voltage in accordance with said reference voltage; and performing an output short-circuit protection operation by comparing said output voltage to said reference voltage and by decreasing said reference voltage when short circuiting occurs at the output so that the output voltage is decreased.

16. The method of claim 15, wherein said step of performing comprises detecting short circuiting at the output by sensing a decreased output voltage.

17. An output short-circuit protection method for a power supply, the power supply converting a first direct-current voltage into a second direct-current voltage and providing as an output voltage said second direct-current voltage at an output, said output short-circuit protection method comprising the steps of:

generating a reference voltage;

stabilizing the output voltage in accordance with said reference voltage; and performing an output short-circuit protection operation by decreasing said reference voltage when short circuiting occurs at the output so that the output voltage is decreased;

wherein said step of decreasing the reference voltage when short circuiting occurs at the output comprises coupling the decreased output voltage to the reference voltage.

18. The method of claim 17, wherein the step of coupling comprises coupling with a diode.

* * * * *